(12) United States Patent
Weber et al.

(10) Patent No.: US 7,495,859 B2
(45) Date of Patent: Feb. 24, 2009

(54) INTERLEAVED SERVO PATTERN

(75) Inventors: Mark P. Weber, Oakdale, MN (US); Richard E. Jewett, Minneapolis, MN (US); Douglas W. Johnson, Stillwater, MN (US); Richard W. Molstad, St. Paul, MN (US); Alan R. Olson, Cottage Grove, MN (US)

(73) Assignee: Imation Corp., Oakdale, MN (US)

( * ) Notice: Subject to any disclaimer, the term of this patent is extended or adjusted under 35 U.S.C. 154(b) by 64 days.

(21) Appl. No.: 11/708,762

(22) Filed: Feb. 20, 2007

(65) Prior Publication Data

US 2008/0198500 A1    Aug. 21, 2008

(51) Int. Cl.
*G11B 5/584* (2006.01)
(52) U.S. Cl. ...................... 360/75; 360/77.12
(58) Field of Classification Search ........................ None
See application file for complete search history.

(56) References Cited

U.S. PATENT DOCUMENTS

| | | | |
|---|---|---|---|
| 3,665,118 | A | 5/1972 | Cooper, Jr. |
| 3,686,649 | A | 8/1972 | Behr |
| 3,869,711 | A | 3/1975 | Bernard et al. |
| 4,007,493 | A | 2/1977 | Behr et al. |
| 4,149,198 | A | 4/1979 | Behr et al. |
| 4,321,634 | A | 3/1982 | Lehureau |
| 4,347,534 | A | 8/1982 | Kimura |
| 4,454,549 | A | 6/1984 | Pennington |
| 4,472,750 | A | 9/1984 | Klumpp et al. |
| 4,498,129 | A | 2/1985 | Velazquez |
| 4,549,232 | A | 10/1985 | Axmear et al. |
| 4,586,094 | A | 4/1986 | Chambors et al. |
| 4,587,579 | A | 5/1986 | Cocke et al. |
| 4,595,327 | A | 6/1986 | Woodley |
| 4,598,327 | A | 7/1986 | Jen et al. |

(Continued)

FOREIGN PATENT DOCUMENTS

EP    0 690 442 A2    1/1996

(Continued)

OTHER PUBLICATIONS

R. C. Barrett et al., "Timing-Based Track-Following Servo for Linear Tape Systems," *IEEE Transactions on Magnetics*, 34:4 1872-1877 (1998).

(Continued)

*Primary Examiner*—Hoa T Nguyen
*Assistant Examiner*—James L Habermehl
(74) *Attorney, Agent, or Firm*—Eric D. Levinson (57) ABSTRACT

In general, the invention is directed to servo techniques that utilize servo patterns to facilitate head positioning relative to the data tracks. For example, the servo techniques may include a first series of servo patterns configured to allow calculation of a position error signal that substantially mitigates error resulting from a variation in velocity of the data storage tape during detection of the at least one of the servo patterns in the first series. The servo techniques may also include a second series of servo patterns interleaved within the first series of servo patterns in order to encode data. The encoded data may include linear position information. Embodiments may allow a data storage tape meeting a currently accepted data storage tape specification, e.g., an LTO Ultrium specification, to record data in a higher density than currently implemented with the specification.

19 Claims, 4 Drawing Sheets

U.S. PATENT DOCUMENTS

| | | | |
|---|---|---|---|
| 5,003,412 A | 3/1991 | Bizjak et al. | |
| 5,055,951 A | 10/1991 | Behr | |
| 5,119,248 A | 6/1992 | Bizjak et al. | |
| 5,132,861 A | 7/1992 | Behr et al. | |
| 5,210,660 A | 5/1993 | Hetzler | |
| 5,223,994 A | 6/1993 | Behr et al. | |
| 5,293,281 A | 3/1994 | Behr et al. | |
| 5,689,384 A | 11/1997 | Albrecht et al. | 360/77.12 |
| 5,923,272 A * | 7/1999 | Albrecht et al. | 360/77.12 |
| 5,930,065 A | 7/1999 | Albrecht et al. | 360/75 |
| 5,995,315 A | 11/1999 | Fasen | |
| 6,021,013 A | 2/2000 | Albrecht et al. | |
| 6,111,719 A | 8/2000 | Fasen | |
| 6,154,330 A | 11/2000 | Nakagawa | |
| 6,169,640 B1 | 1/2001 | Fasen | |
| 6,532,128 B1 * | 3/2003 | Bui et al. | 360/72.2 |
| 6,542,325 B1 | 4/2003 | Molstad et al. | 360/75 |
| 6,574,066 B1 | 6/2003 | Stubbs et al. | |
| 6,580,581 B1 | 6/2003 | Bui et al. | |
| 6,700,729 B1 | 3/2004 | Beck et al. | |
| 6,781,778 B1 | 8/2004 | Molstad et al. | |
| 6,842,305 B2 * | 1/2005 | Molstad et al. | 360/75 |
| 6,879,457 B2 | 4/2005 | Eaton et al. | 360/75 |
| 6,943,979 B2 * | 9/2005 | Goker et al. | 360/77.12 |
| 7,079,343 B2 | 7/2006 | Molstad et al. | |
| 7,289,289 B2 * | 10/2007 | Hoerger et al. | 360/75 |
| 7,333,291 B1 * | 2/2008 | Fasen | 360/77.12 |
| 2004/0105188 A1 | 6/2004 | Dugas | |
| 2008/0174897 A1 * | 7/2008 | Bates et al. | 360/48 |

OTHER PUBLICATIONS

R. C. Barrett et al., "Timing-Based Track-Following Servo for Magnetic Tape," p. EC-06 of *1996 Digests of INTERMAG '96*, IEEE International Magnetics Conference, Apr. 9-12, 1966, Seattle, Washington.

E.G. Gruss et al., "Servo System for Magnetic Recording Based on Time Comparison," *IBM Technical Disclosure Bulletin*, 23:2, 787-789 (1980).

\* cited by examiner

INTERLEAVED SERVO PATTERN

TECHNICAL FIELD

The invention relates to data storage media and, more particularly but without limitation, to magnetic storage media recorded with servo patterns.

BACKGROUND

Data storage media are commonly used for storage and retrieval of data and come in many forms, such as magnetic tape, magnetic disks, optical tape, optical disks, holographic disks or cards, and the like. In magnetic media, data is typically stored as magnetic signals that are magnetically recorded on the medium surface. The data stored on the medium is typically organized along "data tracks," and transducer heads are positioned relative to the data tracks to read or write data on the tracks. A typical magnetic storage medium, such as magnetic tape, usually includes several data tracks. Optical media, holographic media and other media formats can also make use of data tracks.

During data storage and recovery, the head must locate each data track, and follow the path of the data track accurately along the media surface. In order to facilitate precise positioning of the transducer head relative to the data tracks, servo techniques have been developed. Servo patterns refer to signals or other recorded marks on the medium that are used for tracking purposes. In other words, servo patterns are recorded on the medium to provide reference points relative to the data tracks. A servo read head has a fixed displacement relative to the transducer head that reads the data tracks. The servo read head can read the servo patterns, and a servo controller interprets a detected servo pattern and generates a position error signal (PES). The PES is used to adjust the lateral distance of the servo read head relative to the servo pattern and the transducer head relative to the data tracks so that the transducer head is properly positioned along the data tracks for effective reading and/or writing of data to the data tracks.

With some data storage media, such as magnetic tape, the servo patterns are stored in specialized tracks on the medium, called "servo bands." Servo bands serve as references for the servo controller. A plurality of servo patterns may be defined in a servo band. Some magnetic media include a plurality of servo bands, with data tracks being located between the servo bands.

One type of servo pattern is a time-based servo pattern. Time-based servo techniques refer to servo techniques that make use of non-parallel servo marks and time variables or distance variables to identify head position. The time offset between the detection of two or more servo marks can be translated into a PES, which defines a lateral distance of the transducer head relative to a data track. For example, given a constant velocity of magnetic tape formed with servo pattern "/ \", the time between detection of mark "/" and mark "\" becomes longer when the read head is positioned towards the bottom of pattern "/ \" and shorter if the read head is positioned towards the top of pattern "/ \". Given a constant velocity of magnetic media, a defined time period between detected servo signals may correspond to a center of pattern "/ \". By locating the center of pattern "/ \", a known distance between the center of the servo band and the data tracks can be identified. Time-based servo patterns are also commonly implemented in magnetic tape media, but may also be useful in other media.

SUMMARY

In general, the invention is directed to servo techniques that utilize servo patterns to facilitate head positioning relative to data tracks. For example, the servo techniques may provide servo patterns that mitigate error resulting from a variation in velocity of the data storage tape during writing of the servo patterns. The servo techniques may also include a first series of servo patterns configured to allow calculation of a position error signal (PES) that mitigates error resulting from a variation in velocity of the data storage tape during detection of the servo patterns in the first series. The servo techniques may also include a second series of servo patterns interleaved within the first series of servo patterns in order to encode data within the servo patterns. The encoded data may include linear position (LPOS) information.

As an example, the two sets of servo patterns may be configured according to a standard data storage tape specification, such as an LTO Ultrium specification. Compared to standard techniques utilized in systems and tapes meeting an LTO Ultrium specification, the described techniques may provide the additional benefit of allowing calculation of a PES that substantially mitigates error resulting from a variation in velocity of the data storage tape. A PES calculation that substantially mitigates error resulting from a variation in velocity of a data storage tape is more precise than a PES calculation that does not substantially mitigate error resulting from a variation in velocity of a data storage tape. Therefore, the described servo patterns may allow recording data in a higher density than normal for a data storage tape specification. Because such a data storage tape would meet the specifications of a standard format, it could also be used to record data in the (lower) density standard in the data storage tape specification. Optionally, the techniques described herein could be utilized as a standard for a subsequent generation of a currently utilized format to provide data storage tapes that would be backwards compatible with pre-existing tape read/write systems, e.g., LTO Ultrium generation three systems.

In one embodiment, the invention is directed to data storage tape comprising one or more data tracks and a series of substantially identical servo patterns that facilitate head positioning relative to the data tracks. Each of the servo patterns in the series include a first servo mark, a second servo mark that is down-tape relative to the first servo mark and a third servo mark that is down-tape relative to the first and second servo marks. The first servo mark in each of the servo patterns in the series is between the second servo mark and the third servo mark of another one of the servo patterns in the series. Each of the servo patterns in the series is configured to allow calculation of a position error signal for a head detecting at least one of the servo patterns in the series at a cross-tape position.

In another embodiment, the invention is directed to a system for writing servo marks to a data storage tape comprising a first write element that writes a first set of substantially identical time-based servo patterns to the data storage tape at a cross-tape position on the data storage tape. The first write element includes at least three gaps that correspond to at least three servo marks in each of the first set of time-based servo patterns. Each of the first set of time-based servo patterns is configured to allow calculation of a position error signal that substantially mitigates error resulting from a variation in velocity of the data storage tape during detection of the first set of time-based servo patterns. The system further comprises a second write element that writes a second set of substantially identical servo patterns to the data storage tape independently of the first set time-based servo pattern at the cross-tape position. The second write element includes at least one gap. The system further comprises a controller that operates the first write element and the second write element to write the first set of time-based servo patterns and the second set of time-based servo patterns. The controller varies timing of electrical signals used to write the second set of time-based servo patterns in order to encode data on the data storage tape.

In another embodiment, the invention is directed to a method for time-based servo positioning for a data storage media comprising determining if a series of servo marks on the data storage media includes three or more servo marks written by a common pulse. The method further includes, if three or more servo marks on the data storage media were not written by the common pulse, performing a first position error signal calculation. The first position error signal calculation does not substantially mitigate error resulting from variation in velocity of the data storage media during detection of the series of servo marks. The method further includes, if three or more servo marks on the data storage media were written by the common pulse, performing a second position error signal calculation. The second position error signal calculation substantially mitigates error resulting from a variation in velocity of the data storage tape during detection of the series of servo marks.

The details of several embodiments of the invention are set forth in the accompanying drawings and the description below. Other features, objects, and advantages of the invention will be apparent from the description and drawings, and from the claims.

DETAILED DESCRIPTION

Figure 1:
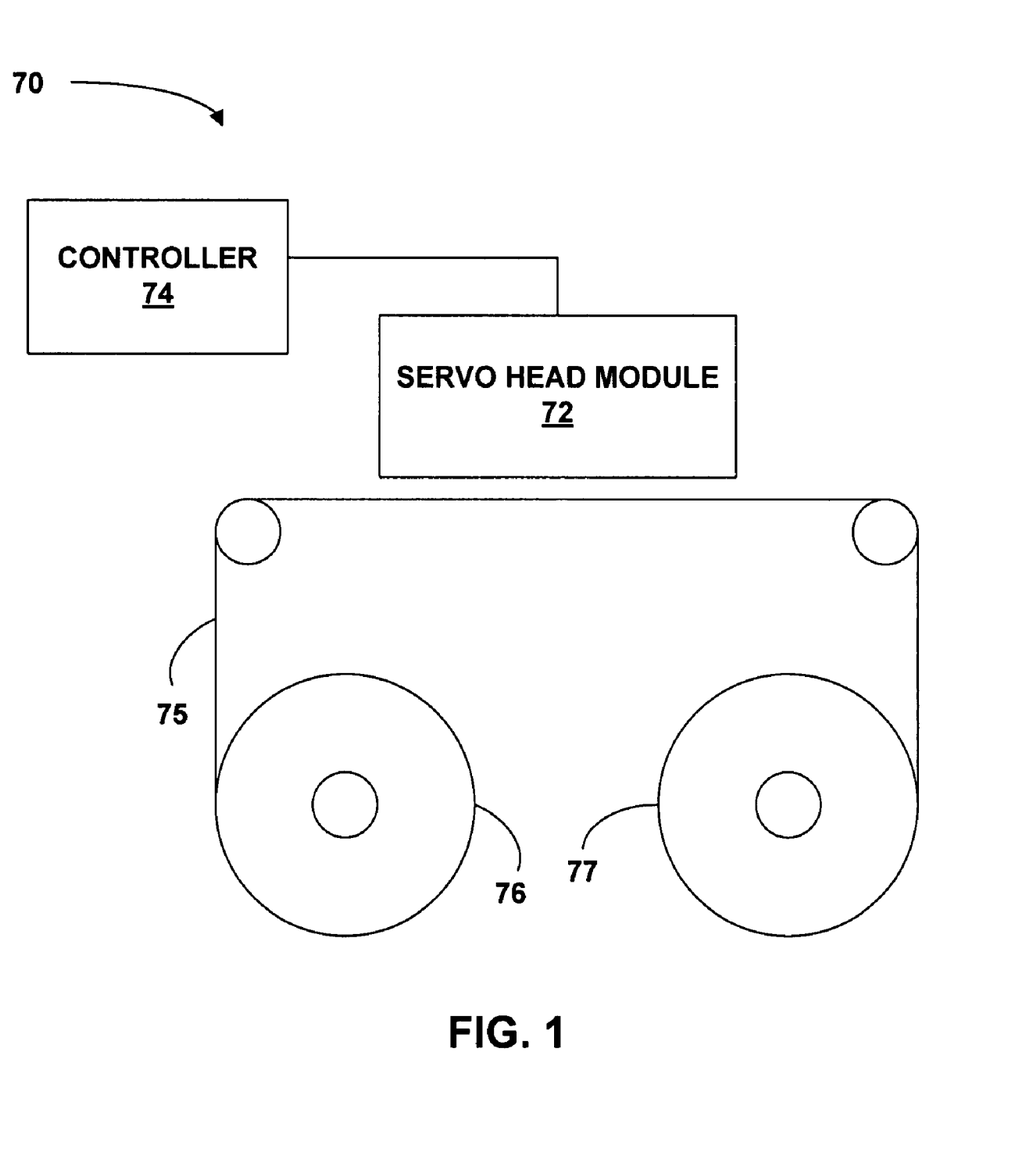
FIG. 1 is a block diagram illustrating an exemplary servo writing system for pre-recording servo patterns on magnetic tape.

FIG. 1 is a block diagram illustrating an exemplary servo writing system 70 for pre-recording servo patterns on magnetic tape 75. System 70 includes servo head module 72, servo controller 74, and magnetic tape 75 spooled on spools 76 and 77. Servo head module 72 contains one or more servo heads to write servo patterns on magnetic tape 75. Controller 74 controls the magnetic fields applied by the one or more servo heads of servo head module 72. Magnetic tape 75 feeds from spool 76 to spool 77, passing in close proximity to servo head module 72. For example, magnetic tape 75 may contact the one or more servo heads of servo head module 72 during servo recording.

Servo head module 72 comprises electromagnetic elements that generate magnetic fields. In one embodiment, controller 74 may cause a first servo head to write substantially over the full servo band associated with magnetic tape 75. Then, controller 74 can cause at least one additional servo head within servo head module 72 to selectively erase servo marks within the prerecorded servo band.

In a different embodiment, the servo band portion of magnetic tape 75 may be randomly magnetized. Controller 74 may cause at least one servo head within servo head module 72 to write servo marks within a randomly magnetized servo band.

A servo head on servo head module 72 includes more than one write element. Each write element may be independently operated to write servo marks on magnetic tape 75. For example, a first write element may be used to provide a servo pattern with at least three servo marks configured to allow correction of error in position error signal (PES) calculation due to read velocity tape speed variation. The second write element may be used to interleave a second servo pattern including servo marks used to encode information among the servo marks written by the first write element. For example, the second write element may be used to interleave servo marks to encode linear position (LPOS) information in accordance with a currently existing tape storage standard format, e.g., an LTO Ultrium format.

Figure 2A:
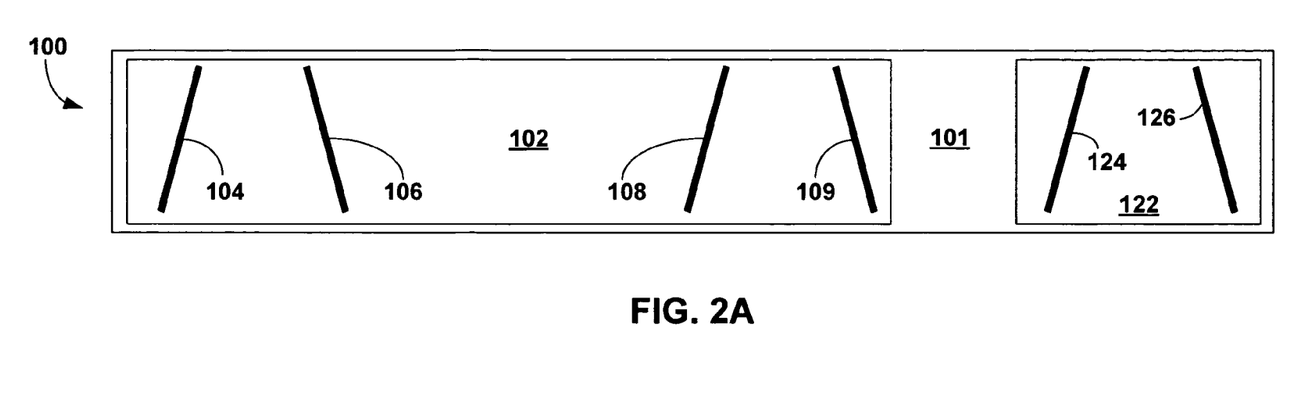
FIG. 2A is a top view of an exemplary servo head.
Figure 2B:
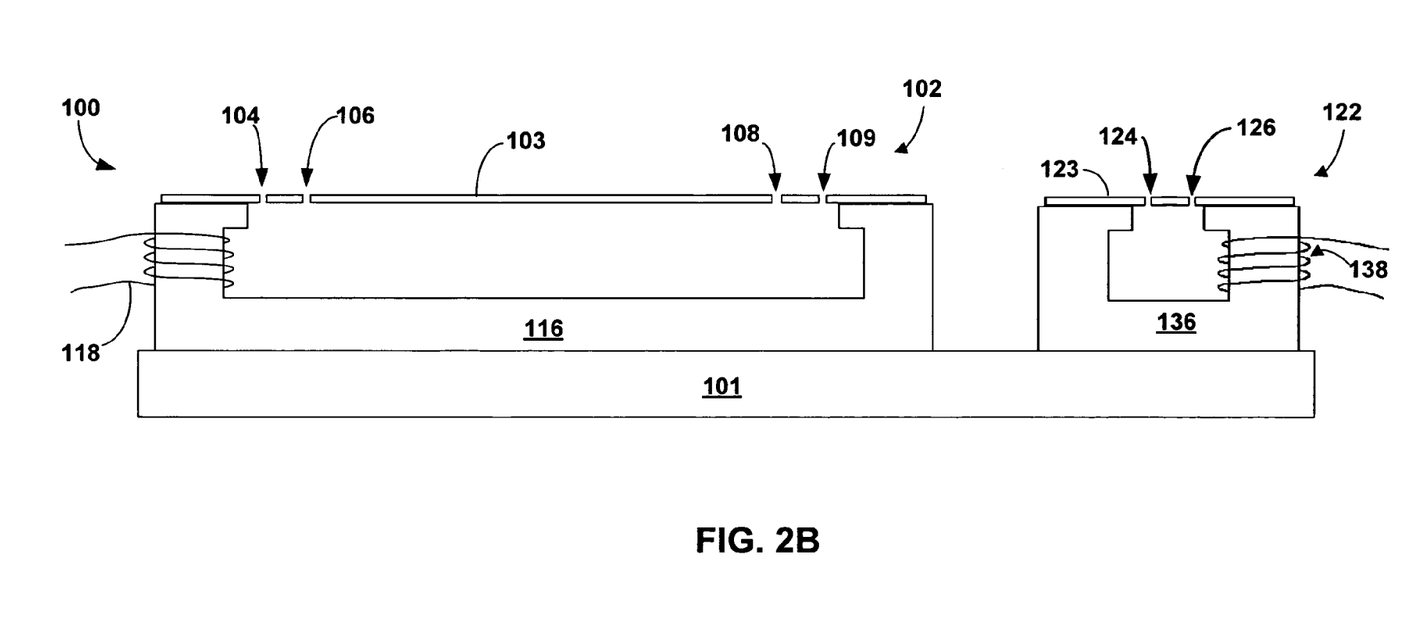
FIG. 2B is a side view of the exemplary servo head illustrated in FIG. 2A.

FIG. 2A is a top view of exemplary servo head 100 comprising two write elements on base 101, including write element 102 and write element 122. FIG. 2B is a cross-sectional conceptual view of servo head 100. Servo head 100 is configured to record a servo pattern on magnetic media. For example, servo head 100 may be a part of servo head module 72 of FIG. 1.

Servo head 100 includes two independent write elements: write element 102 and write element 122. Write element 102 includes four gaps: gap 104, gap 106, gap 108 and gap 109. Similarity, write element 122 includes two gaps: gap 124 and gap 126. When an electrical signal is applied to coil 118, magnetic fields occur across gaps 104, 106, 108 and 109 simultaneously. Likewise, when an electrical signal is applied to coil 138, magnetic fields occur across gaps 124 and 128 simultaneously.

Controller 74 generates timed pulses of magnetic signals to write elements 102 and 122 as magnetic tape 75 (FIG. 1) passes relative servo head 100. More specifically, controller 74 applies electrical signals to write element 102 via coil 118 in order to generate magnetic fields across gaps 104, 106, 108 and 109. For example, electric pulses may be applied to write element 102 via coil 118 in order to generate magnetic fields across gaps 104, 106, 108 and 109. Similarly, controller 74 applies electrical signals to write element 122 via coil 138 in order to generate magnetic fields across gaps 124 and 126. As with write element 102, these electrical signals may be electric pulses.

Each electrical pulse creates a single servo pattern on data storage tape 75. For example, servo patterns recorded with write element 102 include four servo marks: one servo mark for each of gaps 104, 106, 108 and 109. Servo patterns recorded with write element 122 include two servo marks: one servo mark for each of gaps 124 and 126. In each case, the geometry of a servo pattern mirrors the geometry of the gaps used to record the servo pattern.

With magnetic tape 75 moving relative to servo head 100, the timed pulses of magnetic fields from write gaps 104, 106, 108, 109, 124 and 126 leave recorded servo marks to create servo patterns on magnetic tape 75. For example, controller 74 may send electrical pulses through coil 118 according to a repeating pattern of intervals. Controller 74 may also send electrical pulses through coil 138 to interleave servo patterns from write element 122 within the servo patterns from write element 102. The timing of the electrical pulses sent by write elements 102 and/or 122 may be varied to encode information within the servo band. For example, controller 74 may vary the timing of electrical pulses sent through coil 138 relative to a repeating pattern of electrical pulses sent through coil 118 in order to encode LPOS information within the servo band. If desired, additional servo heads may be used with servo head 100 for simultaneous creation of servo patterns on additional servo bands.

To encode information on magnetic tape 75 by varying the timing of electrical pulses sent through coil 138, controller 74 must accurately account for the relative spacing of write elements 102 and 122 and for the tape speed of magnetic tape 75 during the writing of the servo patterns to magnetic tape 75. For example, in many cases preventing servo marks from overlapping would be necessary. To improve accuracy, controller 74 may be calibrated to the actual spacing between write elements 102 and 122 to account for variations in manufacturing processes used to create servo head 100.

Servo head 100 may be manufactured using micromanufacturing techniques such as deposition, masking and etching. For example, magnetic layer 103 may be formed or etched to define gaps 104, 106, 108 and 109, that in turn define the servo pattern of write element 102, and magnetic layer 123 may be formed or etched to define gaps 124 and 126. Magnetic layers 103 and 123 may comprise magnetically permeable layers deposited over electromagnetic elements 116 and 136 via masking techniques to define patterns of gaps as described herein. Alternatively, magnetic layers 103 and 123 may comprise magnetically permeable layers deposited over electromagnetic elements 116 and 136 and then etched to define patterns of gaps. Also, magnetic layers 103 and 123 may be pre-formed to define the gaps and then adhered to electromagnetic elements 116 to define write elements 102 and 122. In other embodiments, gaps 104, 106, 108 and 109 may be formed directly in electromagnetic element 116 to define the servo pattern to be created by write element 102. Likewise, gaps 124 and 126 may be formed directly in electromagnetic element 136 to define the servo pattern to be created by write element 122.

Figure 3:
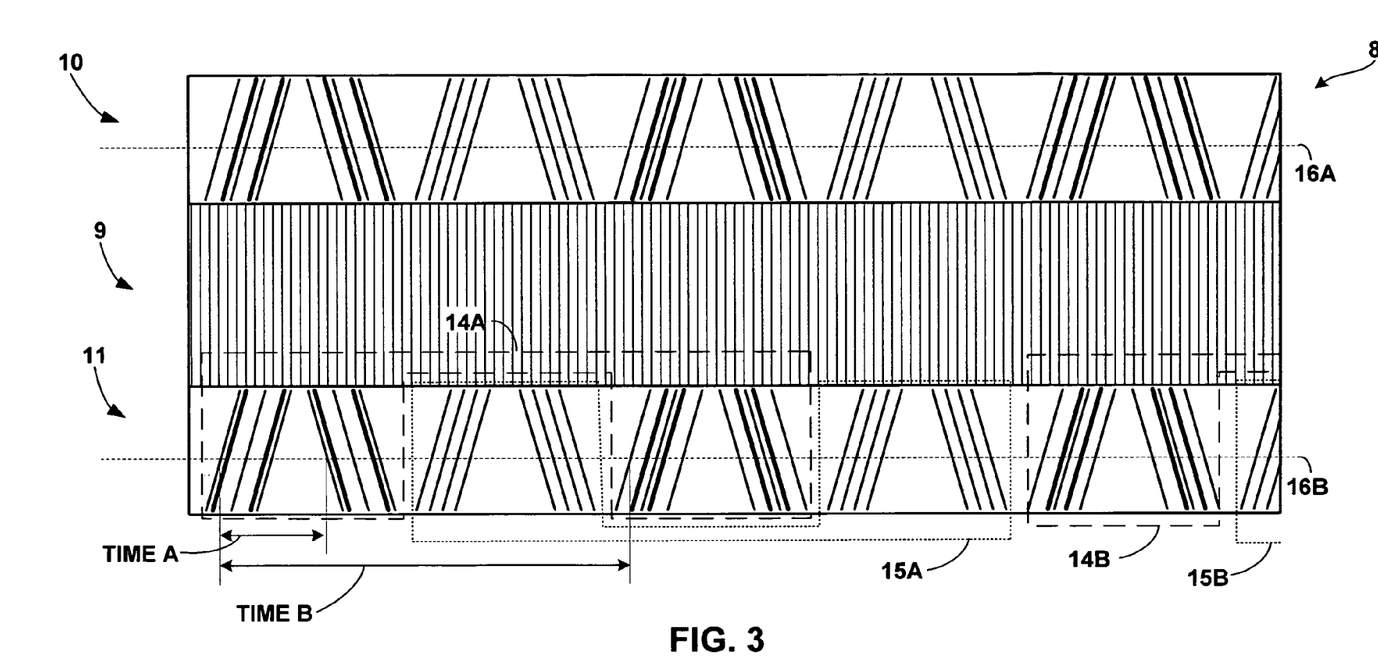
FIG. 3 is a conceptual view of a data storage tape including a series of servo patterns recorded in servo bands.

FIG. 3 is a conceptual view illustrating data storage tape 8 including data tracks 9, servo band 10 and servo band 11. Servo frames 14A and 15A are indicated on FIG. 3 in servo band 11 and are complete. Servo frames 14B and 15B are also indicated on FIG. 3 in servo band 11 but are incomplete as they extend beyond the portion of data storage tape 8 shown in FIG. 3. As referred to herein, a servo frame includes at least one servo pattern, although servo frames often include more than one servo pattern. Servo frames 14A and 14B represent reoccurring groupings of servo marks ("servo frames 14") used to encode information within servo band 11. The darker servo marks within servo frames 14 represent servo marks that have variable spacing used to encode servo information within servo band 11. Servo frames 15A and 15B represent a reoccurring consistently-spaced set of servo patterns interleaved with servo patterns in servo frames 14. As shown in FIG. 3, servo frames 15 themselves do not include encoded information. While the servo frames of servo band 10 are not explicitly indicated in FIG. 3, the techniques described with respect to servo band 11 also apply to servo band 10.

As referred to herein, a servo mark is a continuous shape that can be sensed as a read head passes over a media surface. Time-based servo marks are generally lines, but not necessarily straight lines that extend across a data storage media in a manner that would prevent a servo read head from detecting the mark more than once during a single pass; e.g., in some embodiments, time-based servo marks may have zigzag or curved shapes. With respect to magnetic tape, a servo mark is generally written by a single write gap in a servo head with a single electromagnetic pulse. The term servo marks encompasses servo stripes, which are straight, and also includes curved servo marks and servo marks with other shapes.

A servo pattern includes all the servo marks written at the same time by a single write element. The servo marks in a single time-based servo pattern allow calculation of a PES using time measurements between the detection of servo marks within the pattern by a read head. Generally, all servo marks within a single servo pattern are written using a single electromagnetic pulse so that any inconsistency in tape speed during the servo writing does not affect the spacing of the servo marks in the pattern.

Commonly shaped adjacent servo marks of separate servo patterns within a servo frame are generally written using the same write gap, but may also be written by different, but commonly-shaped write gaps of one or more write elements. These commonly shaped adjacent servo marks of separate servo patterns within a servo frame are referred to herein as a burst. The term burst is in reference to the signal detected as a head passes over the servo marks that make up a burst. For example, servo frame 14A includes four bursts of five servo marks each, while servo frame 1 SA includes four bursts of four servo marks each. In some embodiments, servo patterns may be interleaved as can servo marks and bursts. As shown in FIG. 3, servo frame 14A interleaves servo frame 15A, just as servo frames 14B and 15B interleave.

Servo frames 14 each include two different sets of servo patterns. Each of the servo patterns in the first set of servo patterns includes four servo marks configured as "/ \/ \". Each of the servo patterns in the second set of servo patterns includes two servo marks configured as "/\". For example, the servo patterns in the first set of servo patterns may correspond to write element 102 (FIG. 2), while the servo patterns in the second set of servo patterns may correspond to write element 122 (FIG. 2). The servo patterns in the second set of servo patterns include the darker servo marks in servo band 11. The spacing of the servo patterns in the first set of servo patterns is consistent for each of servo frames 14. In contrast, the spacing of the servo patterns in the second set of servo patterns varies relative to the positions of the first set of servo patterns in order to encode data within servo band 11. For example, each of the four "/ \" servo patterns in the second set of servo patterns in servo frame 14A may be independently located relative to the "/ \/ \" servo patterns in the first set of servo patterns in servo frame 14A to encoded data.

Servo frames 15 only include a single set servo patterns, which are configured identically to the first set of servo patterns in servo frames 14. That is, each of the servo patterns in the set of servo patterns in servo frames 15 includes four servo marks configured as "/ \/ \". The servo patterns in servo frames 15 may be written using the same write element used to write the servo patterns in the first set of servo patterns in servo frames 14, e.g., write element 102 (FIG. 2).

The servo patterns in servo bands 10 and 11 facilitate positioning of a read head relative to data tracks 9, which reside a known distance from servo bands 10 and 11. The location of a read head along one of head paths 16A and 16B ("paths 16") is determined by measuring the time between detection of marks forming a servo pattern.

As shown in FIG. 3, time A represents the time between the detection of the first two servo marks in the first servo pattern in servo frame 14A. From this measurement, the position of the read head within servo band 11 can be determined because the distance between the first two servo marks varies as a function of the lateral position of the path of the read head. For example, if head path 16B were closer to data tracks 9, TIME A would be shorter. Likewise, if head path 16B were further from data tracks 9, TIME A would be greater.

Time B represents the time between the detection of the first and third servo marks in the first servo pattern in servo frame 14A. These two servo marks are parallel and the time between the detection of these two servo marks is independent of the lateral position of the path of the read head. However, the measured TIME B is dependent on the tape speed of data storage tape 8 as it passes over the read head. Because TIME B provides a measurement of the tape speed, TIME B can be used to normalize TIME A for the velocity of data storage tape 8 to more accurately determine the position of the read head. In this manner, TIME B can be used in a PES calculation that substantially mitigates error resulting from a variation in velocity of data storage tape 8 during detection of the servo patterns. In other embodiments, time measurements between the detection of servo marks in a servo pattern including at least three servo marks may have a more complex relationship, but still allow a PES calculation that substantially mitigates error resulting from a variation in velocity of a data storage tape.

By locating the positions of head paths 16 relative to servo bands 10 and 11, a PES can be generated to identify lateral positioning error of the read head relative to the data track(s). While PES calculations only require only a single servo pattern, data from multiple servo patterns within a servo band may be combined to improve accuracy of a PES.

The configuration of servo frames 14 and 15 in servo band 11 is consistent with the specifications of the LTO Ultrium generation three format. Conventionally, data storage tapes utilizing the LTO Ultrium generation three format include only a single servo pattern configured as "/ \". Because this servo pattern only includes two servo marks, it cannot be used to substantially account for tape velocity fluctuations during the detection of the servo marks in the pattern. However, a single servo pattern configured as "/ \" does mitigate error resulting from a variation in velocity of the data storage tape during writing of the servo patterns. In contrast, the "/ V \" servo pattern utilized in data storage tape 8 mitigates error resulting from a variation in velocity of the data storage tape during writing of the servo patterns and allows calculation of a PES that substantially mitigates error resulting from a variation in velocity of data storage tape 8 during detection of the servo patterns.

Figure 4:
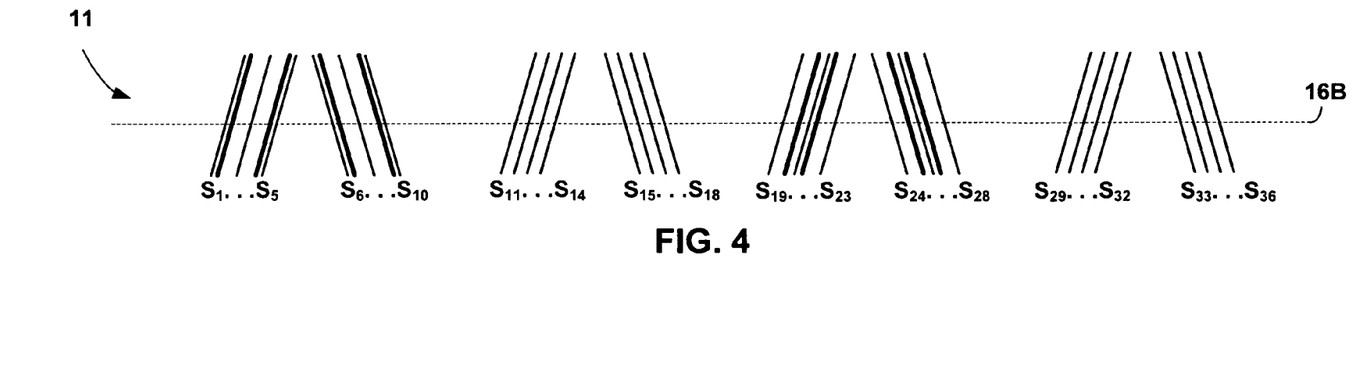
FIG. 4 is a conceptual view of some of the servo patterns from the data storage tape illustrated in FIG. 3.

FIG. 4 is a conceptual illustration of some of the servo marks in servo band 11 of data storage tape 8. For reference, the servo marks in servo band 11 shown in FIG. 4 are labeled as $S_1$-$S_{36}$. As with FIG. 3, the servo marks used to encoded data: servo marks $S_2$, $S_4$, $S_7$, $S_9$, $S_{20}$, $S_{22}$, $S_{25}$ and $S_{27}$, are shown darker than the other servo marks. Notably, the servo marks used to encode data are part of servo patterns including exactly two servo marks, whereas the other servo marks are part of servo patterns including exactly four servo marks.

As examples, looking left to right, the first servo pattern shown in FIG. 4 consists of servo marks $S_1$, $S_6$, $S_{19}$ and $S_{24}$. The second servo pattern shown in FIG. 4 consists of servo marks $S_2$ and $S_7$. The third servo pattern shown in FIG. 4 consists of servo marks $S_3$, $S_8$, $S_{21}$ and $S_{26}$. The fourth servo pattern shown in FIG. 4 consists of servo marks $S_4$ and $S_9$. The spacing of the second servo mark relative the fourth servo mark is used to encode data. The fifth servo pattern shown in FIG. 4 consists of servo marks $S_5$, $S_{10}$, $S_{23}$ and $S_{28}$.

Advanced demodulation, i.e., demodulation that substantially mitigates error resulting from a variation in velocity of data storage tape 8, of servo band 11 requires knowledge of which marks are included in each of the servo patterns including four marks. To determine which marks are part of a servo pattern, a servo head may first perform a PES calculation using only "/ \" pairs of servo marks from each of the servo patterns and read the encoded data in the servo band. The encoded data is commonly used for LPOS information (LPOS). A demodulator may use this information to determine which "/ \" pairs represent the first two servo marks in a servo pattern and which "/ \" pairs represent the corresponding last two servo marks of the "/ V \" servo pattern. For example, an LPOS word may be thirty-six servo frames long, which would be the longest demodulation using only "/ \" pairs of servo marks would be needed until advanced demodulation would be possible.

The timing used in demodulation using only "/ \" pairs of servo marks can be represented as follows:

$$AB = \frac{(S_6 - S_1) + (S_7 - S_2) + (S_8 - S_3) + (S_9 - S_4)}{4} \quad \text{(Equation 1)}$$
$$= AB_{desired}$$

$$CD = \frac{(S_{15} - S_{11}) + (S_{16} - S_{12}) + (S_{17} - S_{13}) + (S_{18} - S_{14})}{4} \quad \text{(Equation 2)}$$
$$= CD_{desired}$$

$$AC = \frac{(S_{11} - S_1) + (S_{12} - S_2) + (S_{13} - S_3) + (S_{14} - S_4)}{4} \quad \text{(Equation 3)}$$
$$= AC_{desired} * \frac{V_{wr\_nom}}{V_{wr\_act}} * \frac{(1 + Err_{gaps} + 1 + Err_{gaps})}{4}$$

$$BD = \frac{(S_{15} - S_6) + (S_{16} - S_7) + (S_{17} - S_8) + (S_{18} - S_9)}{4} \quad \text{(Equation 4)}$$
$$= BD_{desired} * \frac{V_{wr\_nom}}{V_{wr\_act}} * \frac{(1 + Err_{gaps} + 1 + Err_{gaps})}{4}$$

The AB and CD distances are fixed according to the gaps on the write element, e.g., write element 102. The AC and BD distances include error from the write velocity, which is expected in an LTO standard format. There is also error, however, from the placement of the servo marks used to encoded data with respect to the PES gaps for the second and fourth marks.

Equation 3 and Equation 4 can be modified, however, to remove the error introduced by the gap separation. If the AC and BD measurements were made as shown below in Equations 5 and 6, respectively, the only error would still be the write velocity error.

$$AC = \frac{(S_{11} - S_1) + (S_{13} - S_3)}{2} = AC_{desired} * \frac{V_{wr\_nom}}{V_{wr\_act}} \quad \text{(Equation 5)}$$

$$BD = \frac{(S_{15} - S_6) + (S_{17} - S_8)}{2} = BD_{desired} * \frac{V_{wr\_nom}}{V_{wr\_act}} \quad \text{(Equation 6)}$$

Timing used in advanced demodulation of the "/V \" servo patterns to allow a PES calculation that substantially mitigates error resulting from a variation in velocity of the data storage tape during detection of the at least one of the servo pattern can be represented as follows:

$$AB = \frac{(S_6 - S_1) + (S_7 - S_2) + (S_8 - S_3) + (S_9 - S_4)}{4} \quad \text{(Equation 7)}$$
$$= AB_{desired}$$

$$AC = \frac{(S_{19} - S_1) + (S_{21} - S_3) + (S_{23} - S_5)}{3} = AC_{desired} \quad \text{(Equation 8)}$$

Variations in tape speed during the writing of the servo patterns on magnetic tape 8 will affect the precision at which servo patterns from different write elements can be interleaved. However, in the LTO Ultrium specification, decoding of LPOS information only depends on the separation of servo marks used to encode LPOS information and not on their position relative to the other servo marks. For this reason, utilizing a separate write element to interleave servo patterns to encoded data does not effect decoding of that data.

Figure 5:
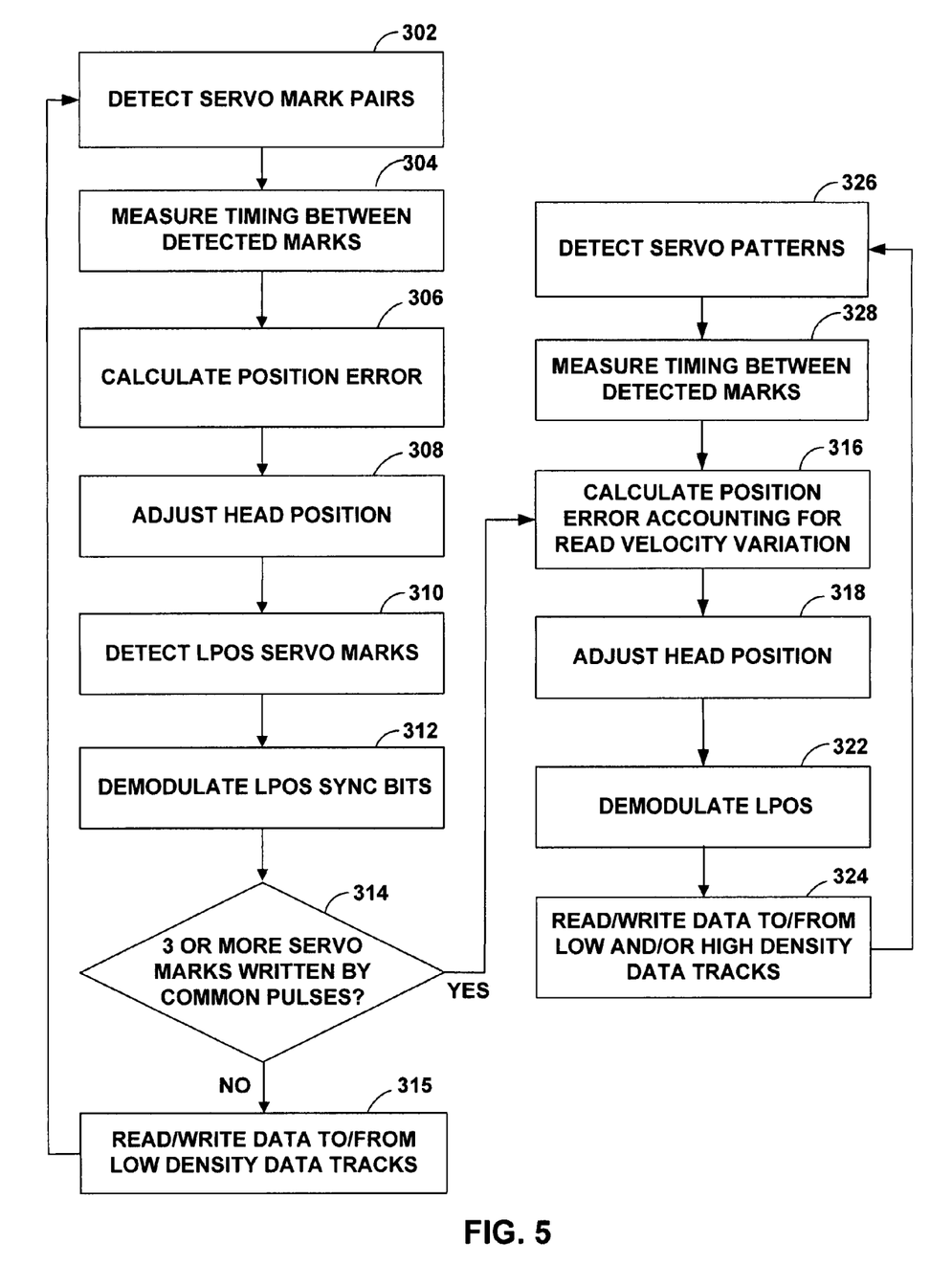
FIG. 5 is a flow diagram illustrating time-based methods for adjusting a head position according to a quality of detected servo marks.

FIG. 5 is a flow diagram illustrating techniques for adjusting the position of a read head within a servo band by measuring the time between detection of servo marks on a data storage tape. For illustration purposes, the techniques shown in FIG. 5 are described with reference to data storage tape 8 of FIG. 3.

Data storage tape 8 passes the read head (not shown in FIG. 3) located along head path 16A relative to data storage tape 8. As data storage tape 8 passes the head, the read head detects the five servo mark pairs "/ \" in the first half of servo frame 14A, followed by the four servo mark pairs "/ \" in the first half of servo pattern 15A (302). As the read head detects the servo marks pairs, a controller (not shown in FIG. 3) measures the timing between the detected marks (304). By the end of servo pattern 15A, the controller has sensed a total of thirty-six marks from servo frames 14A and 15A. The controller stores the timing of each of these servo marks. Because each servo mark causes the same signal response in the head, the controller counts each mark to determine its significance. For example, the controller knows that the first mark and the sixth mark of servo frame 14A combine to form one servo mark pair. The controller calculates a PES for the head according to a cross-tape position of the head relative to the data storage tape according to time intervals between the detection of the servo marks pairs (306). The head position is then adjusted to maintain the desired cross-tape position of the head (308). Equations 1, 2, 3, 4, 5, and 6 are example equations that may be used to demodulate a PES using only servo mark pairs "/ \".

However, the controller does not yet know which of the servo mark pairs combine to form a servo pattern. The controller must demodulate encoded LPOS synchronization bits from the servo pattern to know which of the servo mark pairs combine to form a servo pattern. This requires detecting the marks used to encode LPOS information (310) and demodulating the synchronization bits (312). For example, an LPOS word may be thirty-six servo frames long, which would be the longest the demodulation using only "/\" servo mark pairs would be needed until advanced demodulation would be possible.

Steps 302, 304, 306, 308, 310 and 312 are the same for data storage tapes with servo patterns that only include two servo marks, e.g., "/ \", as is conventional under the LTO Ultrium standard. Decision block 314 represents that in such cases, data can be read to and written to the data storage tape using the standard LTO Ultrium track and bit density (315). During reading and/or writing to such a data storage tape, steps 302, 304, 306, 308, 310, 312 and 315 are repeated as necessary.

As illustrated by decision block 314, if the data storage tape does in fact include servo patterns with at least three servo marks, as is the case with data storage tape 8, once the encoded LPOS synchronization bits have been demodulated, the controller may calculate a PES that substantially mitigates error in the calculated PES resulting from a variation in velocity of the data storage tape 8 (316). Equations 7 and 8 are example equations that may be used to demodulate a PES using the "/ V \" servo patterns. The head position is then adjusted to maintain the desired cross-tape position of the head according to the advanced demodulation (318). LPOS information is also demodulated from the servo patterns used to encoded data (322). By substantially mitigating error in the calculated PES resulting from a variation in velocity of the data storage tape 8, positioning of a read/write head relative to data tracks 9 is more precise. Data is then read from or written to data tracks 9 using either the standard low density data tracks common to the LTO Ultrium standard or higher density data tracks facilitated by the more precise positioning of the "/ V \" servo patterns (324). Using data storage track densities that are the same as the LTO Ultrium standard would allow data on data storage tape 8 to be read by systems that only utilize the LTO Ultrium standard. In this manner, data storage tape 8 not only provides for increased data storage densities relative to an LTO Ultrium standard, but is also backwards compatible with the LTO Ultrium standard.

In order to continuously read from and/or write data to data tracks 9, the read head continuously detects servo patterns as data storage tape 8 passes (326) and the controller measures the timing between the detection of the servo marks (328). During reading and/or writing to data storage tape 8, steps 326, 328, 316, 318, 322 and 324 are repeated as necessary.

In other embodiments, a drive reading data storage tape 8 may utilize only one density for the data tracks rather than having low and high density data tracks as described in steps 315 and 324. Such a disk drive may still benefit from increased accuracy of PES calculations in step 316 by using a PES error standard that is less stringent during steps 302, 304, 306, 308, 310 and 312 and using a more stringent PES error standard for steps 326, 328, 316, 318, 322 and 324. The PES error standards may be used as a required level to continue read and write operations. If the PES error fails to meet the applicable PES error standard, the drive may stop read and write operations. Using a more stringent PES error standard may increase the precision of analog data on the data tracks to reduce a bit error rate of the data when read by the disk drive whenever possible. PES error standards may also be used in combination with the different low and high density data tracks as described in steps 315 and 324.

Various embodiments of the invention have been described. Nevertheless, various modifications may be made without departing from the scope of the invention. For example, in some embodiments, servo patterns may be located within data tracks rather than only in servo band adjacent to data tracks. Additionally, while techniques for using a second write element to provide encoded information interleaved among servo marks written with a first write element are described with respect to servo patterns currently utilized in an LTO Ultrium standard, the described techniques may also be used in other servo pattern configurations. These and other embodiments are within the scope of the following claims.

The invention claimed is:

1. A system for writing servo marks to a data storage tape comprising:

a first write element that writes a first set of substantially identical time-based servo patterns to the data storage tape at a cross-tape position on the data storage tape, wherein the first write element includes at least three gaps that correspond to at least three servo marks in each of the first set of time-based servo patterns, wherein each of the first set of time-based servo patterns is configured to allow calculation of a position error signal that substantially mitigates error resulting from a variation in velocity of the data storage tape during detection of the first set of time-based servo patterns;

a second write element that writes a second set of substantially identical servo patterns to the data storage tape independently of the first set of time-based servo patterns at the cross-tape position, wherein the second write element includes at least one gap, wherein the gaps of the second write element have the same shape and spacing of a subset of the gaps in the first write element, wherein the second write element includes less gaps than the first write element; and a controller that operates the first write element and the second write element to write the first set of time-based servo patterns with the first write element and the second set of servo patterns with the second write element, wherein the controller varies timing of electrical signals used to write the second set of time-based servo patterns in order to encode data on the data storage tape.

2. The system of claim 1, wherein the first servo pattern is configured to mitigate error resulting from a variation in velocity of the data storage tape during writing of the first servo pattern.

3. The system of claim 1, wherein the first write element includes a coil that generates magnetic fields across each of the at least three gaps when it receives electrical pulses.

4. The system of claim 3, wherein the coil is a first coil, wherein the second write element includes a second coil that generates magnetic fields across each of the at least one gap when it receives electrical pulses.

5. The system of claim 1, wherein the encoded data includes linear position information of the data storage tape.

6. The system of claim 1, wherein the first write element comprises:

a first gap;
a second gap;
a third gap and
a fourth gap,
wherein the first gap is parallel to the third gap,
wherein the second gap is parallel to the fourth gap,
wherein the first and third gaps are non-parallel to the second and fourth gaps.

7. The system of claim 1, wherein the first write element comprises a first gap, a second gap, a third gap and a fourth gap,
wherein the second write element comprises a fifth gap and a sixth gap, wherein the fifth gap and the sixth gap have the same shape and spacing as the first gap and the second gap.

8. The system of claim 1, wherein the first write element comprises a first gap, a second gap, a third gap and a fourth gap,
wherein the first gap and the second gap have the same shape and spacing as the third gap and the fourth gap.

9. The system of claim 8, wherein the fifth gap and the sixth gap also have the same shape and spacing as the first gap and the second gap.

10. The system of claim 1, wherein gaps of the first write element are symmetric about a line that is perpendicular to a down tape direction.

11. The system of claim 1, wherein the system is configured to write servo marks according to a data storage tape standard, wherein the data storage tape standard includes data storage tapes having servo patterns with exactly two servo marks.

12. The system of claim 11, wherein the data storage tape standard is a Linear Tape Open (LTO) Ultrium generation three standard.

13. A method for time-based servo positioning for a data storage media comprising:

determining if a series of servo marks on the data storage media includes three or more servo marks written by a common pulse;

if three or more servo marks on the data storage media were not written by the common pulse, performing a first position error signal calculation, wherein the first position error signal calculation does not substantially mitigate error resulting from variation in velocity of the data storage media during detection of the series of servo marks;

if three or more servo marks on the data storage media were written by the common pulse, performing a second position error signal calculation, wherein the second position error signal calculation substantially mitigates error resulting from a variation in velocity of the data storage tape during detection of the series of servo marks; and adjusting a position of a read head relative to the data storage media based on one of the first position error signal calculation, and the second position error signal calculation.

14. The method of claim 13, further comprising:

if three or more servo marks on the data storage media were not written by the common pulse, writing data to the data storage media at a first data storage density; and if three or more servo marks on the data storage media were written by the common pulse, writing data to the data storage media at a second data storage density, wherein the second data storage density is greater than the first data storage density.

15. The method of claim 13, wherein the series of servo marks are in one or more servo bands on the data storage media.

16. The method of claim 13, wherein performing a second position error signal calculation requires:

demodulating synchronization information encoded in the series of servo marks; and determining which servo marks in the series of servo marks was written by the common pulse according to the synchronization information.

17. The method of claim 13, wherein the data storage media is a magnetic data storage tape.

18. A method for time-based servo positioning for a data storage medium comprising:

determining if a series of servo marks on the data storage medium facilitates a position error signal calculation that substantially mitigates error resulting from a variation in velocity of the data storage tape during detection of the series of servo marks;

if the series of servo marks on the data storage medium does not facilitate a position error signal calculation that substantially mitigates error resulting from a variation in velocity of the data storage tape during detection of the series of servo marks, performing a first position error signal calculation, wherein the first position error signal calculation does not substantially mitigate error resulting from variation in velocity of the data storage medium during detection of the series of servo marks;

if the series of servo marks on the data storage medium does facilitate a position error signal calculation that substantially mitigates error resulting from a variation in velocity of the data storage tape during detection of the series of servo marks, performing a second position error signal calculation, wherein the second position error signal calculation substantially mitigates error resulting from a variation in velocity of the data storage tape during detection of the series of servo marks; and adjusting a position of a read head relative to the data storage media based on one of the first position error signal calculation, and the second position error signal calculation.

19. The method of claim 18, further comprising:
if the series of servo marks on the data storage medium does not facilitate a position error signal calculation that substantially mitigates error resulting from a variation in velocity of the data storage tape during detection of the series of servo marks, writing data to the data storage medium at a first data storage density; and
if the series of servo marks on the data storage medium does facilitate a position error signal calculation that substantially mitigates error resulting from a variation in velocity of the data storage tape during detection of the series of servo marks, writing data to the data storage medium at a second data storage density,
wherein the second data storage density is greater than the first data storage density.

* * * * *